United States Patent [19]

Braun et al.

[11] Patent Number: 5,916,360
[45] Date of Patent: Jun. 29, 1999

[54] PROCESS FOR THE PREPARATION OF IRON OXIDE YELLOW PIGMENTS AND THE USE THEREOF

[75] Inventors: Rolf-Michael Braun; Eckhard Bayer; Ulrich Meisen, all of Krefeld, Germany

[73] Assignee: Bayer AG, Germany

[21] Appl. No.: 08/987,627

[22] Filed: Dec. 9, 1997

[30] Foreign Application Priority Data

Dec. 19, 1996 [DE] Germany ............... 196 52 953

[51] Int. Cl.⁶ ............... C01G 49/06; C09C 1/24
[52] U.S. Cl. ............... 106/456; 423/632; 423/633
[58] Field of Search ............... 106/456, 460; 423/632, 633, 434; 252/62.56

[56] References Cited

U.S. PATENT DOCUMENTS

| 2,939,767 | 6/1960 | Martin | 423/633 |
| 4,073,878 | 2/1978 | Otsuki et al. | 423/633 |
| 4,145,228 | 3/1979 | Croce et al. | 106/456 |

FOREIGN PATENT DOCUMENTS

| 704 498 | 4/1996 | European Pat. Off. |  |
| 25 08 932 | 9/1976 | Germany . |  |
| 2749296 | 7/1978 | Germany | 106/456 |

OTHER PUBLICATIONS

Derwent Abstract XP–002062457, Jul. 27, 1993.

Patent Abstracts of Japan, vol. 017, No. 388, Jul. 21, 1993.

*Primary Examiner*—Melissa Koslow
*Attorney, Agent, or Firm*—Connolly & Hutz

[57] ABSTRACT

The present invention relates to a process for the preparation of iron oxide yellow pigments by the process of precipitation from iron(II) chloride and from an alkaline component as well as the use thereof.

18 Claims, No Drawings

PROCESS FOR THE PREPARATION OF IRON OXIDE YELLOW PIGMENTS AND THE USE THEREOF

The present invention relates to a process for the preparation of iron oxide yellow pigments by the process of precipitation from iron(II) chloride and from an alkaline component as well as the use thereof.

The precipitation process for the preparation of iron oxide yellow pigments has been known for a long time. The typical course of this process is described, for example, in Ullmanns Encyclopaidie der technischen Chemie, 5th Edition, Volume A20, pages 297 ff. Iron(II) sulphate obtained during the pickling of steel sheets or else iron(II) sulphate obtained in the production of titanium dioxide by the sulphate process are generally used as the raw material. For years there has been observed an increased trend in the pickling industry towards the use of hydrochloric acid as a pickling agent. Solutions containing iron(II) chloride are therefore being obtained in increasing quantities and these should if possible be processed into a useful material. A common process for its utilisation is the so-called spray-roasting process, wherein iron(II) chloride or iron(III) chloride at elevated temperatures (typically at more than 1000° C.) is subjected to oxidation by hydrolysis. The end products formed are iron oxide, typically haematite, and hydrochloric acid, which is passed back into the pickling process as a useful material. Without special purification steps, on oxidation by hydrolysis an iron oxide is obtained which is suitable for the production of hard ferrites. If soft ferrites are to be produced from these iron oxides, the iron chloride solution has to be subjected to additional purification steps before the hydrolysis, which obviously renders the process expensive and complicated. But as iron chloride, mostly of inferior quality, is increasingly being obtained and the capacity of the ferrite market to absorb it is limited, alternative ways of utilising the iron chlorides economically are being sought. A direct disposal or dumping of iron chloride solutions is not feasible for environmental reasons.

The object of the present invention was therefore to provide a process which renders possible the economical conversion of the iron chloride obtained into a useful material of high quality.

Suprisingly it has been found that the iron(II) chloride obtained can be utilised for the preparation of iron oxide yellow pigments if particular nuclei are present during the precipitation process.

The invention provides a process for the production of iron oxide nuclei for the preparation of iron oxide yellow pigments by precipitation of an iron (II) compound, preferably iron hydroxide or iron carbonate, from an aqueous iron(II) chloride solution with an alkaline component, until 30% to 80% of the iron present is precipitated, and oxidation of the iron(II) compound by means of an oxidising agent, which is characterised in that the iron(II) chloride solution contains aliphatic amines in a quantity such that 0.05 mg/g $FeCl_2$ to 0.5 mg/g $FeCl_2$, of organic carbon is present in the iron(II) chloride solution.

An aqueous $FeCl_2$ solution having, for example, a concentration of 200 g/l of $FeCl_2$, contains preferably 10 to 1000 ppm, based on this solution, of organic carbon originating from the amines.

The aliphatic amines used may be primary as well as secondary or tertiary amines.

The aliphatic amines used are preferably mixtures of different aliphatic amines.

The mixtures consist preferably of amines having unbranched alkyl groups, the alkyl groups being methyl to decyl groups, and/or of the corresponding alkanolamines and/or of amines of naturally occurring or synthetic fatty acids and/or of aliphatic amines having several amino groups.

The mixtures consist preferably of one to four aliphatic amines. Advantageously, the iron (II) chloride solution is a by-product of a pickling of steel sheets or a production of titanium dioxide by a chloride process.

The invention also provides a process for the preparation of iron oxide yellow pigments by the reaction of an iron(II) chloride solution with an alkaline component in the presence of iron oxide nuclei and oxidation by means of an oxidising agent, the iron oxide nuclei used being iron oxide nuclei produced by the process according to the invention.

The iron(II) chloride solution contains aliphatic amines particularly preferably in a quantity such that 0.05 mg/g $FeCl_2$ to 0.5 mg/g $FeCl_2$, of organic carbon is present in the iron(H) chloride solution.

Surprisingly, the use of the aliphatic amines in the production of the nuclei leads to the preferential formation of $\beta$-FeOOH, which is converted to $\alpha$-FeOOH by conversion at more elevated temperatures with the addition of the iron(II) chloride solution and of the alkaline component. In this way an iron oxide yellow pigment is obtained which is particularly suitable for colouring building materials such as concrete, for the preparation of disperse dyes or for colouring plastics and paper. Moreover, considerably higher space-time yields are obtained by the use of iron(II) chloride instead of iron(II) sulphate.

The $FeCl_2$ solutions have concentration preferably of 50 to 500 g/l $FeCl_2$, particularly preferably 150 to 350 g/$FeCl_2$.

The process for the preparation of iron oxide yellow pigments according to the invention is particularly preferably carried out in the following manner.

A. Production of Nuclei

A mixture consisting of alkylamine such as, for example, methylamine, alkanolamine such as, for example, diethanolarnine, fatty acid amine such as, for example, coconut fatty acid amine and polyalkyl polyamine such as, for example, polyethylene polyamine is added to an iron(II) chloride solution in a quantity such that the content of organic hydrocarbon is between 10 and 1000 ppm. In this connection, for example, the first component may be present in quantities of from 2 to 20 wt. % and the other components in quantities of from 0 to 20 wt. %. The remainder may consist of water and a surface-active substance preferably in quantities of from 0.1 to 2.5 wt. % (a fatty acid sulphonate, for example, is preferred). This solution is heated to the precipitation temperature, precipitation taking place preferably at 25° C. to 50° C.

The precipitation itself is effected using an alkaline component. The oxides, carbonates or hydroxides of the alkali metals or alkaline earth metals, or gaseous or aqueous ammonia, may be used as the alkaline component. Typically, aqueous solutions are used in the case of water-soluble compounds or aqueous suspensions in the case of sparingly soluble compounds. The precipitation takes place preferably at a precipitation rate corresponding to 1 to 10 mol of alkaline component per hour and mol $FeCl_2$. As a rule the entire Fe(II) chloride is not precipitated out, but a degree of precipitation of from 30% to 80%, particularly preferably from 40% to 60%, is established. On conclusion of the precipitation, the iron(II) component formed (preferably iron (II) hydroxide or iron(II) carbonate) is oxidised by means of an oxidising agent. $H_2O_2$, nitrates, hypochlorites, chlorites, chlorates or perchlorates, oxygen, ozone or air may be used as the oxidising agent. A particularly preferred embodiment involves the use of atmospheric oxygen. The end of the oxidation can be detected by a sharp fall in the pH value of the suspension. The nuclei formed, which consist of $\alpha$-FeOOH and $\beta$-FeOOH, depending on the production conditions, are preferably not isolated but are used together with the whole of the unreacted iron(II) chloride still present, for the pigment preparation. The reaction may be carried out in various types of apparatus. An agitated batch-operated tank reactor is preferred. A series of agitated reactors may also be used for the production of very large quantities. The mixing of the alkaline component and the iron(II) chloride solution may also be carried out in the bypass by means of static mixers or other mixing units or even in rotating pumps. The addition of the alkaline component and the addition of the oxidising agent may also take place in the bypass and the above-mentioned mixing units may be used in this case.

B. Pigment Preparation

Iron(II) chloride is added to the nuclei described above, the quantity added preferably corresponding to 3 times to 40 times the molar quantity of iron in the total nuclei (that is, hydrated iron oxide and unreacted $FeCl_2$). This suspension is heated, with stirring, to a temperature of between 60° C. and 85° C. and, after this temperature has been attained, is oxidised with one of the oxidising agents already mentioned under A. At the same time the pH value is increased to an end pH value of 3.0 to 5.0, at a rate of 0.01 to 0.4 pH/hour, by the addition of an alkaline component (for example, hydroxides or carbonates of the alkali metals or alkaline earth metals or $NH_3$). The oxidation rate, which is dependent on the rate of addition of the oxidising agent, the temperature, thorough mixing in the tank and the pH value, should preferably be between 0.5 and 10 mol-% iron(II) salt per hour. If the oxidation rate is appreciably below the lower limiting value, the process becomes uneconomic; if the rate of oxidation is very significantly above the upper limiting value, then an unwanted red-tinted iron oxide pigment is obtained. The oxidation is terminated as soon as the Fe(II) content of the suspension is less than 3 mol-%. An extensive oxidation up to 100% reaction is less useful economically, but can definitely be carried out. The conversion of the nuclei into the pigment can generally be carried out in the reactors used for the production of the nuclei.

If insufficient iron(II) chloride is available, then the iron (II) chloride may be partly replaced by iron(II) sulphate both in the production of nuclei and in the pigment preparation. However, the use of iron(II) chloride is the preferred embodiment.

By suitable variation of the given conditions of preparation, a wide spectrum of iron oxide yellow pigments of differing particle size and consequently differing shades can be prepared.

The pigment suspension is processed by the known steps of filtration, drying and grinding.

The iron oxide yellow pigment obtained is particularly suitable for colouring concrete. It can moreover also be used for colouring plastics and paper or for the preparation of disperse dyes or paints and dyes.

The invention is illustrated in more detail by means of the following Examples.

EXAMPLES

1. Production of Nuclei

In an agitated tank equipped with a gas-distributing device for aeration with atmospheric oxygen, 0.29 liters of an aqueous mixture consisting of 5 wt. % polyethylene polyamine [CAS-No. 68603-67-68], 2.5 wt. % coconut fatty acid amine [CAS-No. 61791-14-8], 8 wt. % methylamine and 0.7 wt. % lauryl dodecylsulphonate is added to 600 liters of aqueous iron(II) chloride solution containing 320 g/l $FeCl_2$.

The mixture produces an organic carbon content of 65 ppm in the iron(II) chloride solution.

The solution is heated to 34° C., with stirring. 162 l sodium hydroxide solution containing 300 g/l NaOH is pumped into the solution over a period of 44 minutes. On conclusion of the precipitation process, the mixture is aerated with 3.5 $Nm^3/h$ of air. The pH value is 6.3 after the precipitation and falls to 2.8 at the end of the reaction. The reaction time is 320 minutes. 80% of the reaction product is $\beta$-FeOOH and 20% is $\alpha$-FeOOH. The phase constituents are identified by X-ray powder diffractometry. These nuclei are used directly for the pigment preparation without any further processing.

II. Pigment Preparation 53 l of the nuclei from I is placed in an agitated tank equipped with a device for pH control and a gas-distributing device for aeration. 128 l of an iron(II) chloride solution (as in 1above) is pumped into this suspension of nuclei. Sodium hydroxide solution at a concentration of 300 g/l is then added at a rate such that the pH value of the suspension rises at the rate of 0.2 units per hour. At the same time, the suspension is oxidised by means of air introduced at 320 l/hour. The rise in the pH value is ended when a pH value of 3.65 has been attained. This pH value is maintained constant using sodium hydroxide solution. The aeration is maintained. The reaction is terminated when the Fe(II) content is less than 3 mol-%.

The iron oxide yellow pigment obtained is filtered, washed with water and spray-dried. This product is suitable for immediate use in the construction industry. For other uses, it is advisable to undertake an intensive grinding.

The product has properties (colour strength, shade, et cetera) equally as good as those of the known products prepared by the precipitation process using $FeSO_4$ solution (for example, Bayferrox® 920, product of Bayer AG).

What is claimed is:

1. A process for preparing iron oxide nuclei from an iron (II) chloride solution, the process comprising the steps of:
    a) providing an aqueous solution of iron (II) chloride which contains at least one organic aliphatic amine such that a ratio of said organic carbon to said iron (II) chloride is about 0.05 mg/g to about 0.5 mg/g;
    b) precipitating an iron (II) compound from said aqueous solution with an alkaline component until about 30% to about 80% of the iron (II) present is precipitated; and
    c) oxidizing the iron (II) compound with an oxidizing agent.

2. The process according to claim 1, wherein said aliphatic amines are selected from the group consisting of primary amines, secondary amines, tertiary amines and mixtures thereof.

3. The process according to claim 2, wherein said aliphatic amines are selected from the group consisting of unbranched alkyl amines, unbranched alkanolamines, amino fatty acids, amines having at least two amino groups, and mixtures thereof.

4. The process according to claim 3, wherein said unbranched alkyl groups are selected from the group consisting of $C_1$ to $C_{10}$ alkyl groups.

5. The process according to claim 3, wherein said amino fatty acids are derived from naturally occurring or synthetic fatty acids.

6. The process according to claim 2, wherein said mixture of aliphatic amines includes up to four different types of amines.

7. The process according to claim 1, wherein said iron oxide nuclei comprise predominantly β-FeOOH.

8. The process according to claim 1, wherein said iron (II) chloride solution has a concentration of $FeCl_2$ of between about 50 g/l and about 500 g/l.

9. The process according to claim 8, wherein said iron (II) chloride solution has a concentration of $FeCl_2$ of about 150 g/l to about 350 g/l.

10. The process according to claim 1, further comprising adding a surface-active substance to the aqueous iron (II) chloride solution.

11. The process according to claim 10, wherein said surface-active substance comprises a fatty acid sulphonate.

12. The process according to claim 1, wherein said alkaline component is selected from the group consisting of oxides, carbonates or hydroxides of an alkali metal or alkaline earth metal, and ammonia.

13. The process according to claim 1, wherein about 40% to about 60% of the iron (II) present is precipitated.

14. The process according to claim 1, wherein the iron (II) precipitate comprises iron (II) hydroxide or iron (II) carbonate.

15. The process according to claim 1, wherein said oxidising agent is selected from the group consisting of hydrogen peroxide, nitrates, hypochlorites, chlorites, chlorates, perchlorates, oxygen, ozone, and air.

16. The process according to claim 1, further comprising adding an aqueous solution of iron (II) sulfate to the solution in step a).

17. A process for preparing iron oxide yellow pigments, the process comprising the steps of preparing iron oxide nuclei as claimed in claim 1, and adding thereto further aqueous solution of iron (II) chloride and alkaline component with oxidation to form the pigments.

18. The process of claim 1, wherein said iron (II) chloride solution is a by-product of a pickling of steel sheets or a production of titanium dioxide by a chloride process.

\* \* \* \* \*